United States Patent
Stanimirov et al.

(10) Patent No.: US 6,654,220 B2
(45) Date of Patent: Nov. 25, 2003

(54) METHOD FOR PROTECTION OF AN ELECTRICAL POWER LINE

(75) Inventors: Michael Stanimirov, Baden (CH); Bernhard Deck, Weilheim (DE); Walter Rueegg, Endingen (CH); Klaus-Dieter Weltmann, Baden-Dättwil (CH); Lutz Niemeyer, Birr (CH); Ralf-Dieter Pietsch, Oberlichtenau (DE)

(73) Assignee: ABB Research Ltd, Zurich (CH)

( * ) Notice: Subject to any disclaimer, the term of this patent is extended or adjusted under 35 U.S.C. 154(b) by 90 days.

(21) Appl. No.: 09/964,400

(22) Filed: Sep. 28, 2001

(65) Prior Publication Data

US 2002/0041474 A1 Apr. 11, 2002

(30) Foreign Application Priority Data

Oct. 6, 2000 (EP) .............................. 00810924

(51) Int. Cl.$^7$ ................................. H02H 3/18
(52) U.S. Cl. ........................................ 361/79
(58) Field of Search ........................ 361/78, 79

(56) References Cited

U.S. PATENT DOCUMENTS

| | | |
|---|---|---|
| 5,838,525 A | 11/1998 | Ward et al. |
| 5,910,875 A * | 6/1999 | Tian et al. ............ 361/78 |
| 6,046,895 A * | 4/2000 | Jurisch et al. ............ 361/79 |
| 6,097,582 A * | 8/2000 | John et al. ............ 361/79 |
| 6,466,031 B1 * | 10/2002 | Hu et al. ............ 324/522 |
| 6,532,139 B2 * | 3/2003 | Kim et al. ............ 361/42 |

FOREIGN PATENT DOCUMENTS

EP 196 06 025 8/1997

OTHER PUBLICATIONS

Xia, Y.Q., et al., "Development and Implementation of a Variable-Window Alogrithm for High-Speed and Accurate Distance Protection," IEE Proceedings, dated Jul. 1, 1994, pp. 383–389.

* cited by examiner

*Primary Examiner*—Adolf D. Berhane
(74) *Attorney, Agent, or Firm*—Burns, Doane, Swecker & Mathis, L..L.P.

(57) ABSTRACT

Current and voltage values (uk, ik) are measured for protection of an electrical power line (1). An adaptive estimator is used to analyze all the values within a measurement window, and to convert them to impedance values (Z). The line (1) is switched off if the impedance values (Z) assume unacceptable values. In order to shorten the reaction time, a warning signal (W) is produced if powerful radio-frequency signals are detected on the line (1). When the warning signal (W) occurs, the respective measurement window is located such that its start matches the time of the warning signal (W), and/or the respective measurement window is shortened.

7 Claims, 2 Drawing Sheets

METHOD FOR PROTECTION OF AN ELECTRICAL POWER LINE

FILED OF THE INVENTION

The invention relates to a method for protection of an electrical power line, particularly in the event of short circuits, as claimed in the precharacterizing clause of claim 1. Methods such as these are used to switch off an electrical power line when a short circuit occurs, that is to say when the impedance to ground or to other phases is unacceptably low. The expression electrical power lines in this case includes, in particular, busbars, heavy-current power lines, crosscountry lines or other current-carrying parts.

BACKGROUND OF THE INVENTION

In conventional methods for protection of an electrical power line, an adaptive estimator is used to determine an impedance value between the line and ground or another phase, from a number of measurement points of the current and voltage. The adaptive estimator in this case measures a number of data points of the current and of the voltage in a time measurement window, and uses their profile to calculate the real and imaginary parts of the impedance. This checks whether the impedance value is in a forbidden area, referred to as the tripping area. If this is the case, the line is switched off.

For protection of busbars using such methods, for example with distance protection, signal comparison methods and what is referred to as backward interlocking, detection times in the range from 40 to 60 ms can be achieved depending on the equipment and the fault.

SUMMARY OF THE INVENTION

The invention is based on the object of providing a method of the type mentioned initially, so that rapid detection times are ensured without any major complexity.

This object is achieved by the method as claimed in claim 1.

Thus, according to the invention, a warning signal is produced which is derived from a typical indicator of the occurrence of a short circuit. When this warning signal occurs, the measurement window is restarted and/or is shortened, so that a first estimated value of the impedance is produced as quickly as possible. This makes it possible to react to short-circuit situations more quickly.

The warning signal can be initiated when a radio-frequency signal which is above a predetermined threshold value is detected on the line. Such a signal is produced by a leader, that is to say a current pulse which generally has a duration of several hundred nanoseconds and a magnitude of several amperes. In addition to this, the warning signal can be made dependent on other criteria, for example on whether successive measurement points are more than a predetermined sudden-change value apart from one another, or whether the model used by the estimator indicates an inconsistency in the measured values.

Since the warning signal offers information about the presence of a short circuit, it can also be taken into account in the decision as to whether the circuit breaker should be interrupted.

BRIEF DESCRIPTION OF THE DRAWINGS

Further refinements, advantages and applications of the invention will become evident from the dependent claims and from the description which now follows, with reference to the figures, in which:

DETAILED DESCRIPTION OF THE INVENTION

Figure 1:
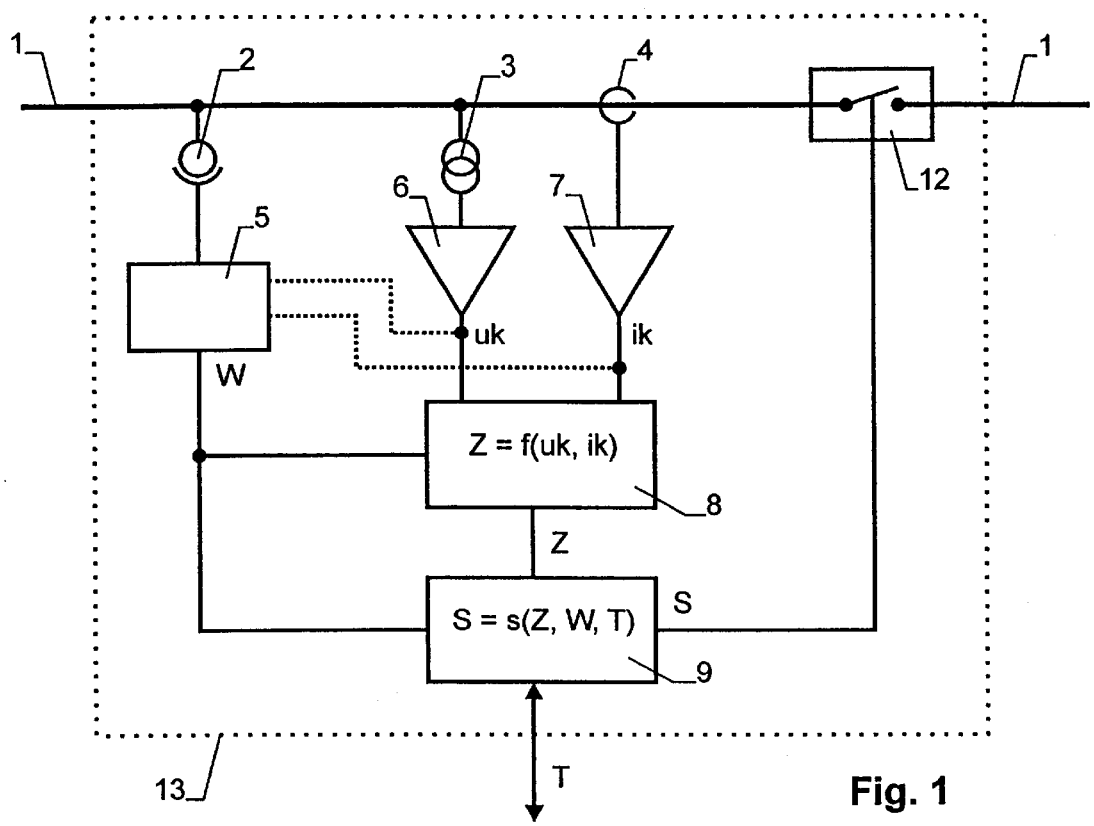
FIG. 1 shows a block diagram of a protection circuit.

FIG. 1 shows one possible design of the protection circuit 13 according to the present invention. The purpose of this circuit is to monitor an electrical power line 1. Three sensors 2, 3, 4 are arranged on the line 1 for this purpose.

A capacitively coupled radio-frequency sensor 2 (which is referred to as a PD sensor or partial-discharge sensor) followed by a processing circuit 5 detects suddenly occurring signals in the kHz or MHz range, whose amplitude is above a specific threshold value. Signals such as these generally accompany a sudden change in the impedance Z of the line. A warning signal W is produced when such a signal occurs. The radio-frequency sensor may be in the form of a partial-discharge sensor, and may also carry out its tasks in addition.

A voltage sensor 3 followed by a processing circuit 6 measures the voltage on the line 1, and produces corresponding voltage values $u_k$ (k=1,2, . . . ) at regular time intervals.

A current sensor 4 followed by a processing circuit 7 measures the current on the line 1, and produces corresponding current values $i_k$ (k=1,2, . . . ), at regular time intervals.

The measurement points with the voltage values $u_k$ and the current values $i_k$ are supplied together with the warning signal W to an estimator 8. This uses a predetermined number n of successive current and voltage values $i_1, \ldots i_n$ and $u_1 \ldots u_n$ occurring in a measurement window to determine an estimated value for the impedance Z of the line 1

$$Z=f(i_1 \ldots i_n, u_1 \ldots u_n).$$

The number n denotes the duration of the measurement window. Z is a complex number. Suitable functions f are known to those skilled in the art.

By way of example, f may be in such a form that all n measurement points within the measurement window are included with the same weight in the result Z, or such that measurement points are weighted less strongly as the time from their origin increases.

Iterative and recursive estimation methods are also known, for example the RLS method (recursive least squares), in which the value of n is theoretically infinite, but in which measurement points from a long time ago no longer have any significant influence on the result. In the context of this description, the expression "duration of the measurement window" is also used for methods such as these. The duration in this case corresponds to a typical period for the influence of the individual measurement points on the result to decay. For example, it may be defined as the number of points for which a value change of 50% still leads to a change of at least 10% in Z.

The estimator 8 uses the function f to produce corresponding estimated values $Z_1, Z_2, \ldots$ for the impedance Z for successive measurement windows, which may also overlap.

Figure 2:
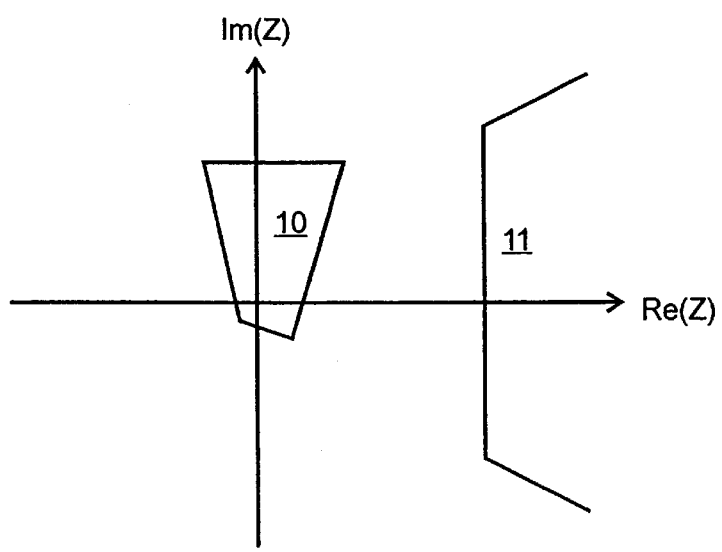
FIG. 2 shows an illustration of the complex plane of the impedance values.

The impedance values $Z_i$ are supplied, in the same way as the warning signal W as well, to a switch controller 9. This analyzes the impedance values $Z_i$, for example by comparing them with predetermined areas in the complex plane. This is illustrated in FIG. 2. In this case, two areas are marked in the complex plane: a tripping area 10 covers the area of unacceptable impedance values, and an operating area 11 covers the area of normal impedance values. If the switch controller finds that a number of successive impedance values Zi are located in the tripping area, then a switch signal S is produced in order to cause a circuit breaker 12 to interrupt the line 1.

There are various methods for analyzing the locus of the impedance values $Z_i$ in the diagram shown in FIG. 2. For example, pattern recognition techniques may be used to analyze them, so that typical acceptable and unacceptable movement patterns of the impedance values can be distinguished from one another. Circuits based on neural networks are particularly suitable for evaluation of such patterns.

The switch controller 9 also has an input and output T (TRIP), via which it can interchange details about the respective state with other protection circuits 13 and, possibly, with a central monitoring point.

The warning signal W is used to identify unacceptable impedance values as quickly as possible. As already mentioned, the warning signal W indicates radio-frequency interference signals on the line 1, which are typical of the occurrence of sudden impedance changes, for example in the event of a short circuit.

If a warning signal W is detected, then the following measures are taken alternatively or in combination in the estimator 8.

A: The measurement window is located such that its start essentially matches the time of the warning signal W. By way of example, it starts with those current and voltage values $i_k$, $u_k$ which were the first to be measured after the warning signal. This measure ensures that, essentially, the only current and voltage values which are within the measurement window are those which are associated with the short-circuit state and, in consequence, an impedance Z based on the measured values after the occurrence of the warning signal is determined at the earliest possible time.

B: The duration n of the measurement window is shortened in comparison to that in normal operation. Although this has an adverse effect on the measurement accuracy, it allows initial results to be obtained more quickly. If this is an estimation method in which the influence of relatively old measurement points on the result decreases continuously, the decay rate can for this purpose be increased, or the weighting of older points can be reduced. In recursive methods, the iteration process may be reinitialized, for example, for this purpose.

Both of these measures are illustrated schematically in FIG. 2. In this figure, Z1, Z2, Z3 . . . denote the individual measurement windows and the impedance values determined from them. As can be seen, a warning signal W was initiated in the measurement window associated with Z3. The measurement window Z3 was terminated in an appropriate manner, and a new, shortened measurement window Z4 was started, in order to obtain valid results as quickly as possible. The subsequent measurement windows Z5 to Z7 become increasingly longer, for example, until the normal state is reached once again.

The warning signal W is also supplied to the switch controller 9. This takes account of the fact that the occurrence of a warning signal is an indication of a short circuit, and it uses this information for producing the switch signal S, that is to say the switch signal S is dependent not only on the impedance Z, but also on the warning signal W. Furthermore, as is described further below, it is also dependent on the values supplied via the input T. This can be expressed in the following form:

$$S=s(Z,W,T)$$

In this case, s describes an "unacceptability criterion" and is a function of the impedance Z or impedance values Zi of the input T and of the warning signal W.

Thus, for example, after a warning signal has occurred, the circuit breaker 12 can be interrupted after just a few unacceptable impedance values $Z_k$, since there are clear indications of a short circuit. If no warning signal occurred, then the circuit breaker 12 would not be interrupted until a greater number of unacceptable impedance values had occurred. The unacceptability criterion s is thus satisfied more quickly after the occurrence of a warning signal W than without any warning signal.

Figure 3:
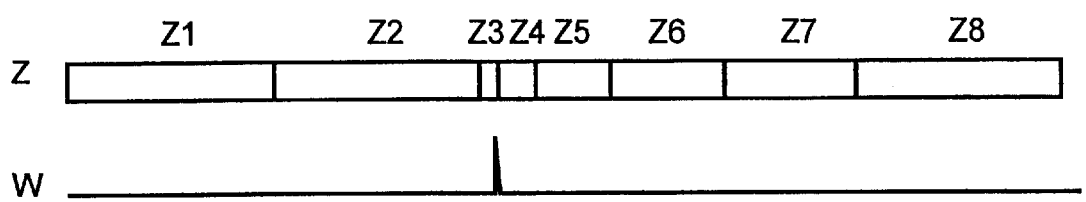
FIG. 3 shows the positioning and duration of the measurement window before and after the occurrence of a warning signal.
Figure 4:
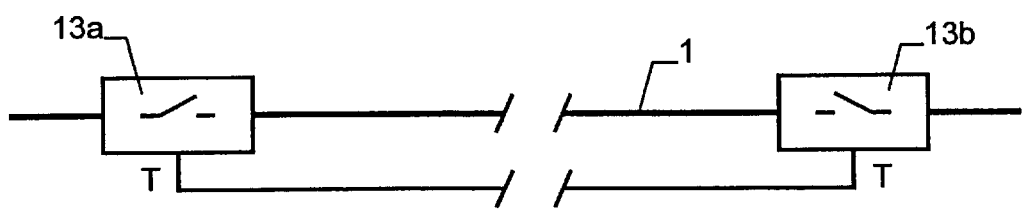
FIG. 4 shows a line with protection circuits on both sides.

FIG. 3 shows one possible use of the input or output T. In this case, a respective protection circuit 13a, 13b monitors each of the ends of a line 1. The protection circuits 13a, 13b interchange data via their inputs and outputs T. If a short circuit occurs in the vicinity of the first protection circuit 13a, it reacts to this immediately, since it measures very low impedance values. However, since the short circuit is a relatively long way away from the second protection circuit 13b, the latter does not react as quickly since the impedance values which are reached are not as low here. However, via the input/output T, it receives from the first protection circuit the information that a short circuit is present. This also allows its circuit breaker to be interrupted immediately.

Corresponding configurations to those shown in FIG. 3 can also be used for monitoring busbars. In this situation, more than two protection circuits 13 generally interact.

In the exemplary embodiment described so far, the warning signal W was initiated only when a radio-frequency signal of a specific strength was detected. In addition, it may be necessary to initiate the warning signal W when the duration of the radio-frequency signal is greater than a predetermined threshold duration.

However, it is also possible to make the warning signal W dependent on the current and voltage values $i_k$ and $u_k$ respectively, as is indicated by dashed lines in FIG. 1.

For this purpose, for example, the differences $$Di_k = |i_k - i_{k-1}|$$

$$Du_k = |u_k - u_{k-1}|$$

between successive current and voltage values are compared with maximum sudden-change values $Di_{max}$ and $Du_{max}$, respectively. If one or both of the differences rises above the respective sudden-change value, then the warning signal W is initiated, since rapidly varying current and voltage values are also an indication of a short circuit.

Furthermore, it is, for example, possible to find inconsistencies in the measured values in the estimator 8 by, for example, multiplying a current value by the most recently obtained impedance value, and comparing this with the next voltage value. Severe discrepancies between the measured values and such a model are also indications that a short circuit has occurred.

The components of the protection circuit 13, and in particular of the estimator 8, the switch controller 9 and the processing circuit 5 for the warning signal may be in the form of hardware and/or software, and may be in the form of individual units or a common functional block.

List of Reference Symbols

1: Electrical power line
2: Radio-frequency sensor
3: Voltage sensor
4: Current sensor
5: Processing circuit for warning signal
6: Processing circuit for voltage sensor
7: Processing circuit for current sensor
8: Estimator
9: Switch controller
10: Tripping area
11: Operating area
12: Circuit breaker
13, 13a, 13b: Protection circuit
$i_k$: Current values
n: Duration of the measurement window
s: Unacceptability criterion
S: Switch signal
T: Communication path to other protection circuits
$u_k$: Voltage values
W: Warning signal
Z: Impedance
$Z_i$: Impedance values

What is claimed is:

1. A method for protection of an electrical power line, particularly in the event of short circuits, in which an adaptive estimator is used to determine impedance values ($Z_i$) from measurement points ($i_k$, $u_k$) in measurement windows, with each measurement window containing a number of measurement points, and with the line being switched off if the impedance values (Z) satisfy an unacceptability criterion (s) wherein a warning signal (W) is produced only if a radio-frequency signal above a predetermined threshold value is detected on the line, and in that, when the warning signal (W) occurs, the respective measurement window is located such that its start essentially coincides with the occurence of the warning signal (W) and/or in that, when the warning signal (W) occurs, the respective measurement window is shortened in comparison to normal operation.

2. The method as claimed in claim 1, wherein each measurement point ($i_k$, $u_k$) each contains one current value ($i_k$) and one voltage value ($u_k$) for the line.

3. The method as claimed in claim 1, wherein a number of successive impedance values ($Z_i$) are analyzed in order to detect the presence of a short circuit.

4. The method as claimed in claim 1, wherein the unacceptability criterion (s) is dependent on the warning signal (W) in such a manner that, after a warning signal has occurred, the unacceptability criterion is satisfied more quickly than without any warning signal.

5. The method as claimed in claim 1, wherein measurement points ($i_k$, $u_k$) are determined, and warning signals (W) are produced, in at least two protection circuits on the electrical power line, with data being interchanged between the two protection circuits in order to determine whether one of the protection circuits has detected a short circuit, so that the other protection circuit also interrupts the line.

6. The method as claimed in claim 1, wherein the warning signal (W) is produced if a radio-frequency signal with a duration above a predetermined threshold duration is detected on the line.

7. The method as claimed in claim 1, wherein a warning signal (W) is produced if values of successive measurement points are more than a predetermined sudden-change value ($Di_{max}$, $Du_{max}$) apart from one another.

* * * * *